United States Patent [19]
Ryan et al.

[11] Patent Number: 6,123,358
[45] Date of Patent: Sep. 26, 2000

[54] AIR BAG MODULE WITH VARIABLE INFLATION

[75] Inventors: Shawn Gregory Ryan, Dayton, Ohio; James Lloyd Webber, Macomb County, Mich.

[73] Assignee: General Motors Corporation, Detroit, Mich.

[21] Appl. No.: 09/075,731

[22] Filed: May 11, 1998

[51] Int. Cl.[7] .................................................. B60R 21/30
[52] U.S. Cl. ........................................... 280/739; 280/742
[58] Field of Search ..................................... 280/742, 739, 280/736, 738

[56] References Cited

U.S. PATENT DOCUMENTS

| | | |
|---|---|---|
| 5,330,226 | 7/1994 | Gentry et al. . |
| 5,366,242 | 11/1994 | Faigle et al. . |
| 5,413,378 | 5/1995 | Steffens, Jr. et al. . |
| 5,695,214 | 12/1997 | Faigle et al. . |
| 5,707,078 | 1/1998 | Swanberg et al. . |
| 5,820,162 | 10/1998 | Fink ........................................ 280/742 |
| 5,853,192 | 12/1998 | Sikorski et al. ........................ 280/739 |

*Primary Examiner*—Peter C. English
*Assistant Examiner*—Lynda Jasmin
*Attorney, Agent, or Firm*—Kathryn A. Marra

[57] ABSTRACT

An air bag module includes an air bag and an inflator being activatable to discharge inflator gas for inflating the air bag. The inflator has at least one discharge port through which inflator gas is discharged. A housing includes at least one inflator vent opening aligned with the discharge port. A variable inflation device is mounted on the inflator and includes a movable member alignable with the vent opening. The movable member is movable relative to the vent opening for opening and closing the vent opening at a predetermined time during inflator activation to control the amount of inflator gas discharged into the air bag and the amount of inflator gas expelled out through the vent opening of the housing. Preferably, the variable inflation device includes an initiator device being activatable during activation of the inflator to move the movable member relative to the vent opening at the predetermined time during inflator activation.

13 Claims, 8 Drawing Sheets

AIR BAG MODULE WITH VARIABLE INFLATION

TECHNICAL FIELD

This invention relates to an air bag module capable of variable air bag inflation.

BACKGROUND OF THE INVENTION

It is well known in the prior art to provide an air bag module which includes an inflatable air bag for protection of a vehicle occupant. The air bag module typically includes an inflator for discharging inflator gas to inflate the air bag. Upon sensing certain predetermined vehicle conditions, such as a certain amount of vehicle deceleration, the inflator discharges a fixed amount of inflator gas and the air bag is deployed.

In some cases, it may be desirable to provide an inflator that has varied levels or stages of inflator gas output in response to the sensing of different vehicle or occupant conditions. Thus, it is also known in the prior art to provide a dual-stage inflator that can discharge predetermined amounts of gas at one or two levels. However, these dual-stage inflators are more complex than typical inflators and have the limitation of typically providing only two different levels of gas output. An inflator that discharges inflator gas at a wide range of levels is not readily available. Even if available, dual-stage or multi-stage inflators are complex to manufacture and add mass to the air bag module.

It has also been suggested in the prior art to provide an air bag module including a reaction canister which houses the inflator and air bag and which includes a valve member which is continually repositioned for opening, closing, or partially opening the vent openings on the reaction canister primarily in response to changes in ambient temperature by the use of a bimetallic spring, servo motor or solenoid valve. Thus, the amount of the discharging inflator gas expelled from the housing is controlled solely by the exact position of the valve member which must be carefully positioned for providing partial opening of the vent openings. In addition, the prior art teaches that the position of the valve member and the amount of venting is continually adjusted during vehicle use prior to activation of the inflator rather than only specifically at the time of air bag deployment. In addition, the use of a bimetallic spring, servomotor or solenoid takes time to move the valve member between the various positions and thus is continually being adjusted prior to activation of the inflator. This arrangement is also complex and adds mass to the module.

SUMMARY OF THE INVENTION

This invention provides advantages and alternatives over the prior art by providing a variable inflation device that provides a wide range of levels of inflator gas into the air bag. This can be accomplished with an inflator having a single output level for discharging inflator gas. Advantageously, this invention provides a lightweight device mounted on the inflator which can be activated nearly instantaneously to vary the amount of venting for the module and thus the level of inflator gas discharged into the air bag based upon occupant and vehicle conditions. Thus, the device need only be activated under circumstances in which the inflator is activated and not on a continual basis prior to inflator activation. Preferably, the level of inflator gas discharged into the air bag is varied based on the exact time that a vent opening in the housing is either opened or closed during inflator activation. Advantageously, the device may be expendable since it is only used once, if at all, during inflator activation. Furthermore, the device is compact and is mounted externally on the inflator such that the variable inflation device serves the dual purpose of attaching the inflator to the housing in addition to providing variable inflation. Furthermore, other than vent holes, the variable inflation device requires no modifications to the housing and is not limited by the shape of the housing. In addition, the variable inflation device may be used with traditional single stage inflators without internal modifications to the inflator.

These advantages are accomplished in the present invention by providing an air bag module for restraint of an occupant in a vehicle. The module includes an air bag and an inflator being activatable to discharge inflator gas for inflating the air bag. The inflator has at least one discharge port through which inflator gas is discharged. A housing includes at least one inflator vent opening aligned with the discharge port. A variable inflation device is mounted on the inflator and includes a movable member alignable with the vent opening. The movable member is movable relative to the vent opening for opening and closing the vent opening at a predetermined time during inflator activation to control the amount of inflator gas discharged into the air bag and the amount of inflator gas expelled out through the vent opening of the housing. Preferably, the variable inflation device includes an initiator device being activatable during activation of the inflator to move the movable member relative to the vent opening at the predetermined time during inflator activation.

Thus, it will be appreciated that variable levels of inflation of the air bag can be achieved using a single inflator having only a single level of gas output in combination with at least one vent opening that is preferably either entirely opened or entirely closed at a predetermined time during discharge of inflator gas by a movable member in response to activation of the initiator device. Almost instantaneous control of the movable member is enabled by the use of the initiator device that reacts nearly instantaneously to the signal received from the vehicle sensors. It will also be appreciated that this system provides a relatively simple, cost effective, and lightweight solution to providing variable levels of air bag inflation from a single level inflator.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
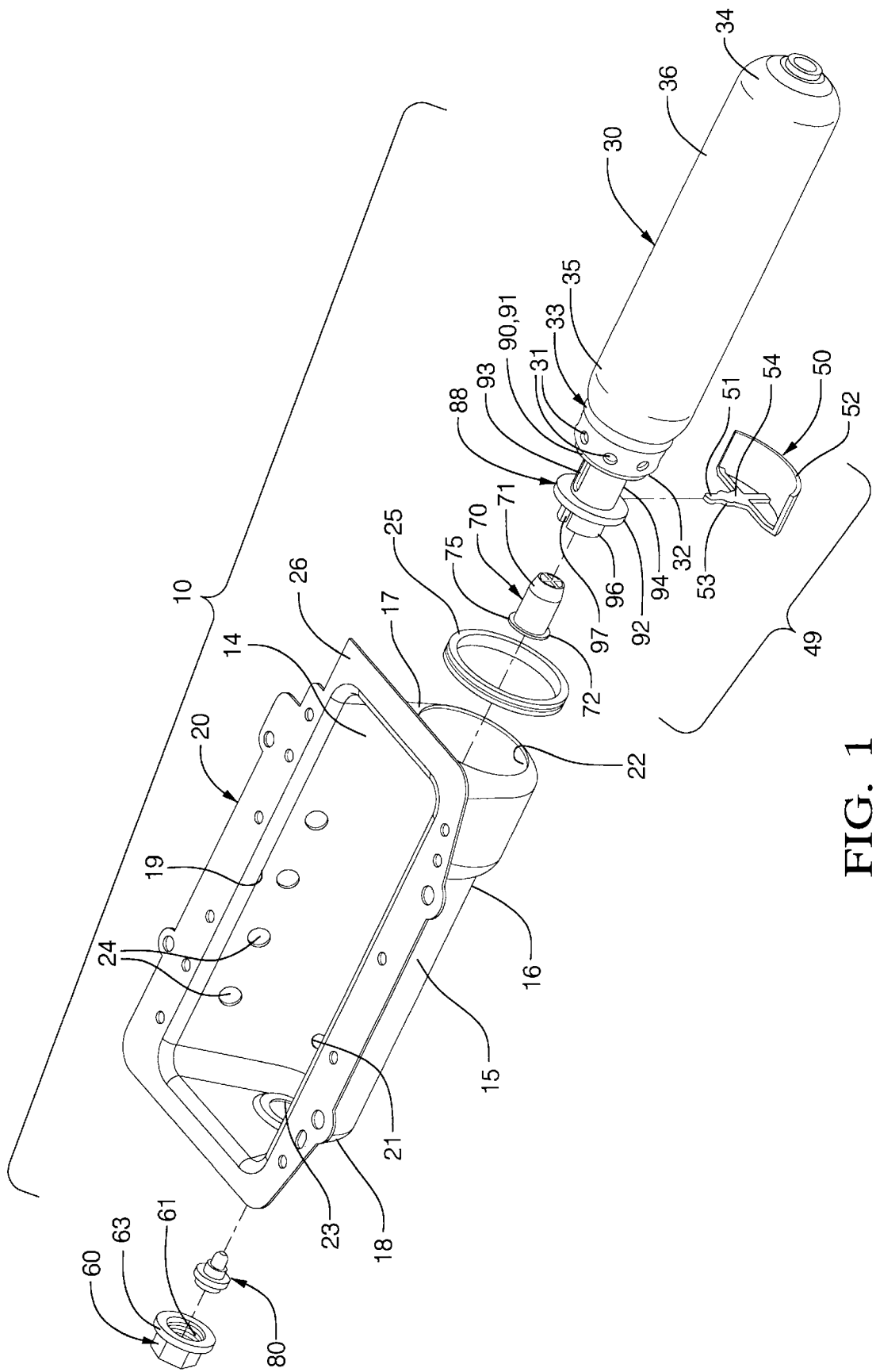
FIG. 1 is an exploded perspective view showing a passenger side air bag module including an inflator having a movable member for closing a vent opening in the housing, but not showing the air bag.
Figure 2:
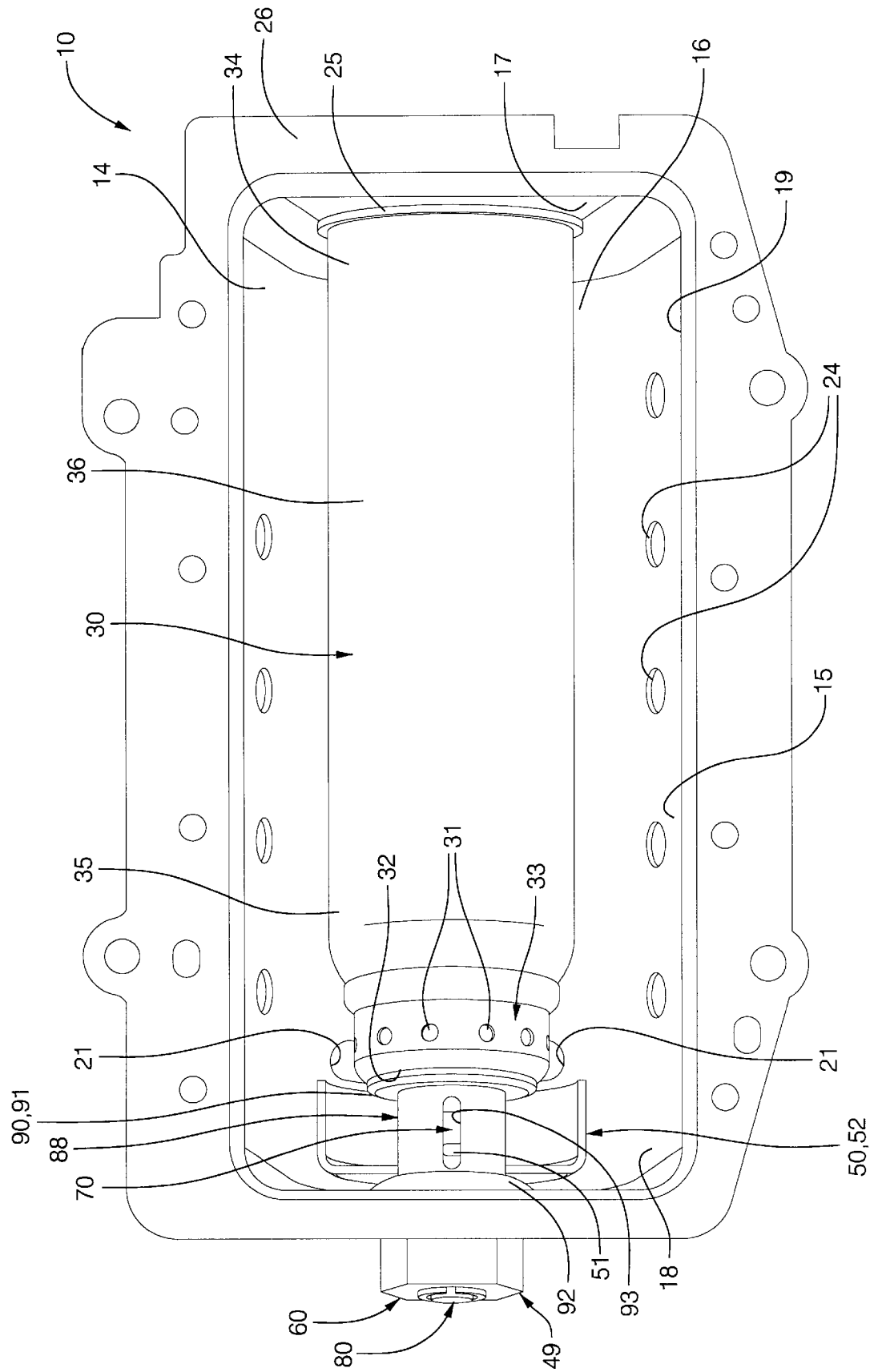
FIG. 2 is a top assembled view of the air bag module of FIG. 1.
Figure 3:
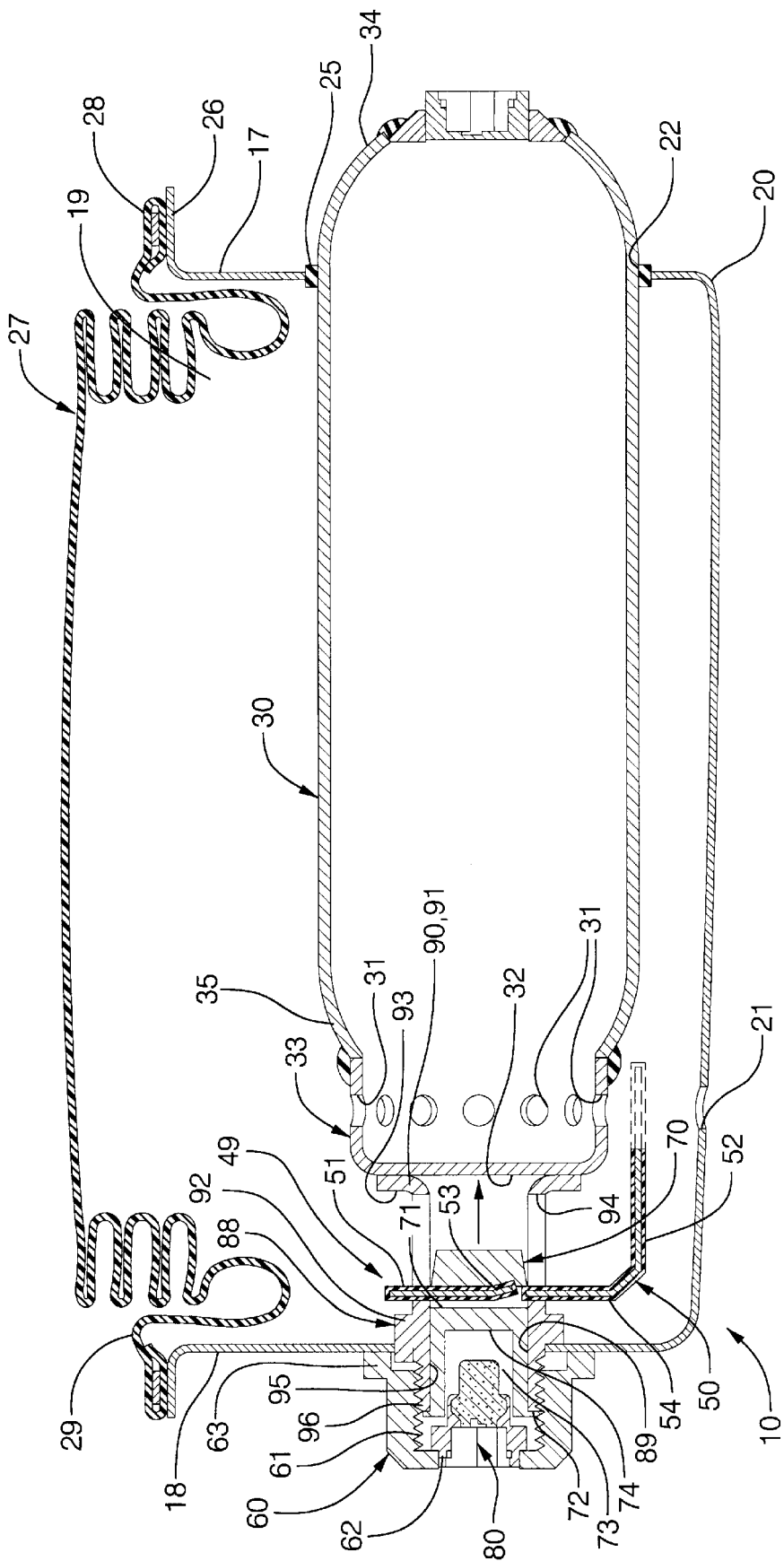
FIG. 3 is a sectional view taken generally along line 3—3 of FIG. 4 and showing the movable member in a first position in solid lines and in a second position in phantom lines, and including the air bag.

Referring to FIGS. 1–3, an air bag module 10 is mounted in a vehicle (not shown) for protection of a vehicle occupant (not shown). The module 10 includes a housing 20, an inflatable air bag 27, and an inflator 30 for generating gas to inflate the air bag 27. The module 10 is typically mounted on the passenger side of the vehicle, but could also be mounted in other locations on the vehicle. The module 10 is secured to the vehicle in any suitable manner. The module 10 further includes a variable inflation device 49 which is externally mounted on the inflator 30 to provide a variable inflation device assembly 48. The variable inflation device 49 is used to vary the amount of inflator gas available for air bag inflation and mount the inflator 30 to the housing 20, as described in detail hereinafter.

The housing 20 includes opposing sides walls 14, 15 joined by a bottom wall 16 and opposing end walls 17, 18. As best shown in FIGS. 1 and 3, the end wall 17 includes an enlarged first end opening 22 for receiving the inflator 30 and variable inflation device 49 therethrough during assembly. In addition, the other end wall 18 preferably includes a second end opening 23 which is smaller than the first end opening 22 for mounting the components of the variable inflation device 49. The side walls 14, 15 and end walls 17, 18 cooperatively define a housing opening 19 through which the air bag 27 is deployed. The housing 20 further includes one or more direct inflator vent openings 21 which are preferably positioned in the bottom wall 16 of the inflator 30 and which are directly aligned with specific predetermined discharge ports 31 in the bottom of the inflator 30. The direct inflator vent opening 21 is preferably in the shape of an elongated slot. One or more connector strips (not shown) may extend across the direct inflator vent opening 21 to prevent the bottom wall 16 surrounding the relatively large direct inflator vent opening 21 from deforming during the discharge of inflation gas. The housing 20 may also include a plurality of side vent openings 24 in the side walls 14, 15 which are not aligned with the discharge ports 31, and which may be used for air bag deflation during ride down after full air bag deployment, as is well known in motor vehicles.

As best shown in FIG. 1, the inflator 30 may be of any conventional construction for generating inflator gas to inflate the air bag 27. Advantageously, the inflator 30 is preferably a single stage inflator 30 which outputs inflator gas at a single level for inflating the air bag 27. The inflator has a generally cylindrical body portion 36 and is insertable through the first end opening 22 in the end wall 17 for insertion within the housing 20. The inflator 30 also includes a plurality of discharge ports 31 which are preferably circumferentially spaced around a diffuser portion 33 of the inflator 30. Preferably, certain predetermined discharge ports 31 are generally in direct alignment with the corresponding direct inflator vent openings 21 in the bottom wall 16 of the housing 20. The inflator 30 includes a first end 34 and an opposite second end 35 on which the diffuser portion 33 is located. The second end 35 of the inflator 30 includes a generally flat head portion 32 onto which the variable inflation device 49 can be attached, as described further hereinafter. The first end 34 of the inflator 30 is seated in the first end opening 22 of the housing 20 and is preferably surrounded by a grommet 25 for preventing vibration. The second end 35 of the inflator 30 is operatively connected to the housing 20 by the variable inflation device 49, as described further hereinafter.

The air bag 27 may be of any conventional construction for inflating upon the discharge of inflator gas. Referring to FIG. 3, the air bag 27 is stored in a folded condition atop the inflator 30 prior to inflator activation. Upon activation of the inflator 30, the air bag 27 is filled with a predetermined amount of inflator gas as dictated by the variable inflation device 49 and deploys out through the housing opening 19 for protection of the vehicle occupant. A cushion retainer 28 sewn into a mouth portion 29 of the air bag 27 may be utilized to attach the air bag 27 to a rim portion 26 of the housing 20. However, it will be appreciated that many other air bag 27 attachment methods are possible.

As best shown in FIG. 1, the variable inflation device 49 includes a plunger 70, a support member 88, a movable member 50, a cap nut 60, and an initiator device 80. The support member 88 preferably has a hollow tubular shape. The support member 88 includes interior walls 95 defining an axial opening 89 into which the plunger 70 and the initiator device 80 can be inserted during assembly. The support member 88 includes a first support end 90 preferably having a flange 91 that is secured directly to the head portion 32 of the diffuser portion 33 of the inflator 30 at the second end 35. The flange 91 may be secured by any suitable method, such as welding, and the support member 88 is preferably made of a metallic material. The support member 88 also includes a spacing shoulder 92 which is sized larger than the second end opening 23 of the housing 20 so that the support member 88 is limited from going through the second opening 23 and is properly positioned within the housing 20 during assembly. The spacing shoulder 92 is preferably integrally formed with the support member 88, such as by dimpling or molding, but may also be provided as a separate piece attached to or slipped over the support member 88, as will be described further hereinafter in the alternate embodiment of FIGS. 5 and 6. In the installed condition, the spacing shoulder 92 abuts the end wall 18 of the housing 20, as best shown in FIGS. 2 and 3.

Preferably, the support member 88 is externally attached to the inflator 30 and may be provided as an assembly with the inflator 30 or may alternately be integrally formed with the inflator 30. Advantageously, the variable inflation device 49 may be used without any internal modifications to the inflator 30. As best shown in FIG. 2, the support member 88 includes upper and lower guide holes 93, 94 that are vertically aligned with each other. The upper and lower guide holes 93, 94 are axially elongated along the length of the support member 88 such that the movable member 50 may be moved along the length of the guide holes 93, 94 upon actuation of the variable inflation device 49. The movable member 50 is vertically inserted through the guide holes 93, 94 and the plunger 70 during assembly such that the movable member 50 is coupled to the plunger 70 and guided by the guide holes 93, 94, as described further hereinafter. The support member 88 further includes a threaded end portion 96 extending past the spaced shoulder 92 and spaced axially away from the inflator 30 to extend out through the second end opening 23 of the housing 20 for mating with the cap nut 60 to secure the inflator 30 and variable inflation device 49 to the housing 20. As best shown in FIG. 1, the support member 88 may include a notched orientation feature 97 for proper positioning of the support member 88 relative to the housing 20 and for proper positioning of the upper and lower guide holes 93, 94.

The variable inflation device 49 further includes a plunger 70 which is preferably integrally formed from a plastic material and has a generally cylindrical shape. The plunger 70 is seated inside the support member 88 and has a diameter which is slightly smaller than the diameter of the axial opening 89 such that the plunger 70 is slidable relative to the interior walls 95 of the support member 88. The plunger 70 includes a radial plunger hole 71 which is sized for close receipt of the movable member 50 therethrough, such as by snap-fitted attachment. It will be appreciated that other methods of attaching the movable member 50 to the plunger 70 may also be used, such as crimping, fastening, or adhesion. The plunger 70 includes a shear feature 72 that is shown as a flange located at an end of the plunger 70. The shear feature 72 is preferably integrally formed with the plunger 70, but may also be a separate piece attached to the plunger 70. The shear feature 72 is sized larger than the axial opening 89 of the support member 88 such that the shear feature 72 engages the support member 88 during insertion to limit the insertion of the plunger 70 into the support member 88. In addition, the movable member 50 coupled to the plunger 70 is properly positioned in the module 10 by the shear feature 72. Upon activation of the initiator device 80, the shear feature 72 breaks off and permits the plunger 70 to slide within the support member 88 until engaging the head portion 32 of the inflator 30 which acts as a stop surface. The plunger 70 also preferably includes an axial plunger bore 73 in which the initiator device 80 is seated prior to activation. A reaction surface 74 of the plunger 70 is located in the bottom of the axial bore 73. The plunger 70 may also include a notched plunger orientation feature 75 for proper alignment of the plunger hole 71 for assembly.

As best shown in FIG. 1, the movable member 50 includes an upwardly projecting arm portion 51 and a slide portion 52 extending generally at a right angle to the arm portion 51. The arm portion 51 preferably includes snap features 53 which enable the arm portion 51 to be snap-fittedly attached within the plunger hole 71. However, it will be appreciated that the arm portion 51 could be attached to the plunger 70 by any suitable method. The slide portion 52 has a generally curved shape that allows the movable member 50 to fit through the first end opening 22 of the housing 20 during assembly and also may be generally shaped like the contour of the bottom wall 16 of the housing 20. The movable member 50 also may include rib portions 54 that prevent deflection of the slide portion 52 during air bag inflation. However, it will also be appreciated that it may be advantageous to allow the curved slide portion 52 to deflect in the closed position to the shape of the bottom wall 16 of the housing 20 for better sealing of the direct inflator vent opening 21. The movable member 50 is movable relative to the inflator vent opening 21 for opening and closing the inflator vent opening 21 at a predetermined time to control the amount of inflator gas discharged into the air bag 27 and the amount of inflator gas expelled out through the inflator vent opening 21 of the housing 20 so as not to be available for air bag inflation. The slide portion 52 of the movable member 50 is positionable adjacent to the inflator vent opening 21, and preferably the slide portion 52 is sized equal to or greater than the inflator vent opening 21. Referring to FIGS. 1–3, the movable member 50 is shown in a first position in solid lines in which the inflator vent opening 21 is open for lowering the amount of gas available for air bag inflation. FIG. 3 shows the slide portion 52 in phantom lines in a second position in which the movable member 50 is in the closed condition to block the inflator vent opening 21 and permit full inflation of the air bag 27.

A cap nut 60 is preferably threadably attached by internal threads 61 to the threaded end portion 96 of the support member 88. Preferably, the initiator device 80 is coupled to the cap nut 60 and extends partially into a cap nut end opening 62 for connecting the initiator device 80 to an electrical source. The cap nut 60 secures the initiator 80 and plunger 70 to the support member 88 by sandwiching the end wall 18 of the housing 20 between the spacing shoulder 92 of the support member 88 and a cap nut flange 63. In addition, the securement of the cap nut 60 to the support member 88 attaches the support member 88, and thus the inflator 30, securely to the housing 20.

The shear feature 72 holds the plunger 70 and the movable member 50 in a first initial position within the support member 88. It will be appreciated that in the first position, the slide portion 52 is preferably not aligned with the inflator vent opening 21 on the housing 20 such that the inflator vent opening 21 is preferably entirely open prior to activation of the inflator 30, as best shown in FIG. 1, for controlled reduction in inflation gas available for initial air bag inflation. Upon activation of the initiator device 80, the plunger 70 and movable member 50 coupled thereto are movable to a second position in which the slide portion 52 on the movable member 50 is aligned with the inflator vent opening 21 on the housing 20. Thus, when the movable member 50 is in the second position, the inflator vent opening 21 is entirely closed such that all inflation gas is available for air bag inflation, as described further hereinafter.

The initiator device 80 or squib preferably contains a chemical which is ignited upon receiving a signal from vehicle sensors (not shown). A wire (not shown) transmits a signal from the sensors to the initiator device 80 to activate the initiator device 80. Upon activation, the initiator device 80 produces a pressure wave that presses against the reaction surface 74 of the plunger 70 and quickly forces the plunger 70 and the movable member 50 coupled to the plunger 70 from the first position to the second position. Advantageously, the initiator device 80 produces a pressure wave almost instantaneously and preferably within less than 1 ms after activation. Thus, upon firing of the initiator device 80 the movable member 50 is moved from the first position in which the vent openings 21 are entirely open to the second position in which the vent openings 21 are entirely closed, almost instantaneously.

Figure 4:
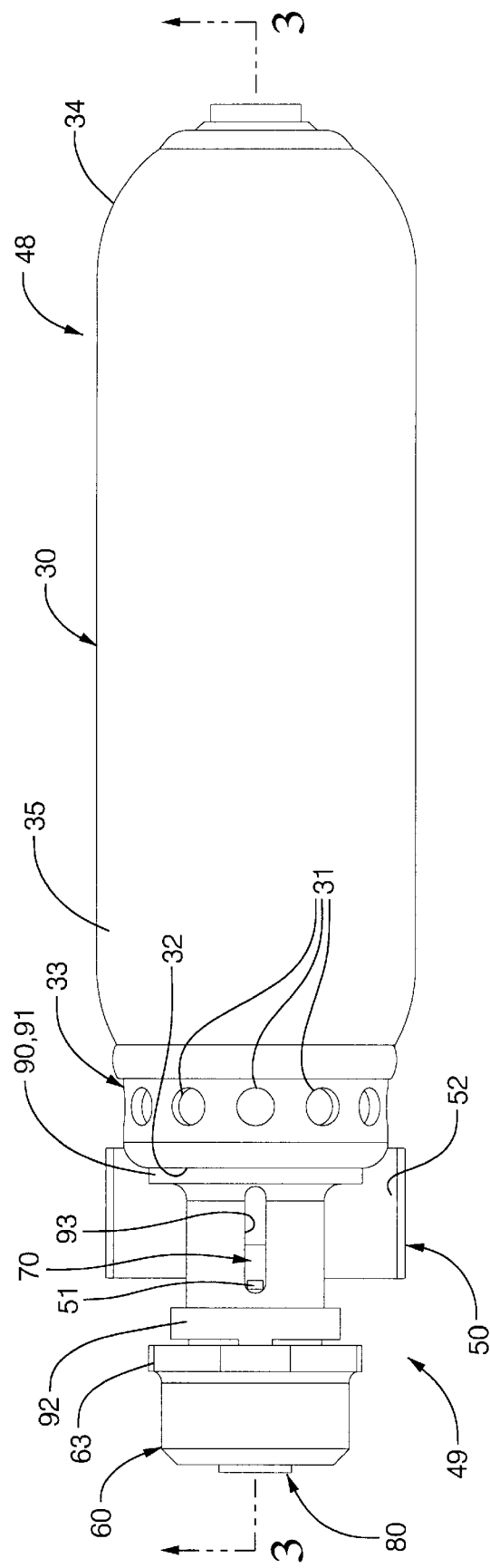
FIG. 4 is a top view of the variable inflation device assembly without the housing and air bag.

Referring to FIGS. 1 and 4, the variable inflation device assembly 48 is assembled as follows. The support member 88 is mounted on the head portion 32 of the inflator 30 and the plunger 70 is inserted into the axial opening 89 of the support member 88 until the shear feature 72 engages the support member 88 to limit further insertion. Next, the arm portion 51 of the movable member 50 is inserted through the lower guide hole 94 and into the radial plunger hole 71 and out through the upper guide hole 93. The arm portion 51 is preferably attached to the plunger 70 by the snap-fitted attachment feature 53. It will be appreciated that during activation, the guide holes 93, 94, guide the arm portion 51 to control the movement of the movable member 50. Next, the initiator device 80 can be pressed into the cap nut end opening 62. Then the initiator device 80 can be inserted into the plunger bore 73 and the cap nut 60 can be screwed onto the threaded end portion 96 of the support member 88 to complete the variable inflation device assembly 48, as shown in FIG. 4.

If the module 10 is manufactured at the same location as the variable inflation device assembly 48, then the cap nut 60 need not be added until after assembly of the inflator 30 to the housing 20. The variable inflation device assembly 48, minus the cap nut 60 and initiator device 80, is inserted through the first end opening 22 of the housing 20 as enabled by the curved shape of the slide member 52. The threaded end portion 96 of the support member 88 is inserted through the second end opening 23 until the spacing shoulder 92 engages the end wall 18. Next, the cap nut 60 with the initiator device 80 therein can be screwed onto the threaded end portion 96 of the support member 88 to secure the variable inflation device assembly 48 to the housing 20.

Prior to activation of the inflator 30, the air bag 27 is stored in a folded condition atop the inflator 30. Also prior to activation of the inflator 30, the movable member 50 is held within the support member 88 in the first position by the shear feature 72 with the slide portion 52 misaligned with the inflator vent opening 21 such that the inflator vent opening 21 is open. Upon sensing certain predetermined vehicle and occupant conditions, the sensors send a signal to the initiator device 80 advising the initiator device 80 whether the movable member 50 should be open or closed at a predetermined time during activation of the inflator 30 so that a certain amount of inflator gas is expelled out through the inflator vent opening 21. Referring to FIG. 3, if the initiator device 80 is fired, the pressure wave or flame expelled by the initiator device 80 reacts against the reaction surface 74 of the plunger 70 and instantaneously shoots the plunger 70 and movable member 50 into the second position. The movement of the plunger 70 breaks off the shear feature 72 such that the movable member 50 is nearly instantaneously shifted from the first position to the second position. When the movable member 50 is moved to the second position, the slide portion 52 is aligned with the inflator vent opening 21 such that the inflator vent opening 21 is entirely closed and inflator gas is blocked from expelling out the inflator vent openings 21.

Advantageously, certain predetermined inflator ports 31 are aligned directly with the inflator vent opening 21 such that the when the movable member 50 is in the first position, the inflator gas is expelled directly out through the inflator vent opening 21 and is never used to inflate the air bag 27. This is in contrast to typical vents like the side vent openings 24 which are designed to allow inflator gas to pass over the side vent openings 24 and even enhance the inflation gas available by drawing in ambient air due to the Bernoulli effect during air bag inflation. Then, the same side vent openings 24 can be used after full air bag inflation to vent gas out during occupant ride down. Thus, the typical vent openings 24 of the prior art cannot provide variable inflation, but instead simply provide full air bag inflation and permit ride down venting.

By using the externally mounted device 49, the amount of inflator gas discharged into the air bag 27 is variable to a wide range of levels, even with the use of the single stage inflator 30, as will now be described. Upon the sensing of predetermined vehicle conditions by sensors (not shown), the inflator 30 is activated and receives the signal to begin the process of discharging inflator gas at a time which will be designated as 0 milliseconds. It is noted that after the inflator 30 is activated, it may take an additional few milliseconds before the inflator gas actually begins to be discharged into the air bag 27. It will also be appreciated that the inflator gas is discharged over a brief known period of total time for a given inflator 30 after activation. For example, after activation at 0 milliseconds, inflator gas may be discharged until a total time of 60 milliseconds after activation. Of course, the amount of time that gas is discharged depends on the type of inflator 30 and is in no way limited to the example of 60 milliseconds. Advantageously, the use of a initiator device 80 enables the inflator vent openings 21 to be either opened or closed almost instantaneously upon firing of the initiator device 80. Thus, the amount of inflator gas discharged into the air bag 27 is easily varied by moving the movable member 50 at a specific predetermined time as enabled by firing the initiator device 80.

The predetermined time for moving the movable member 50 is determined in response to predetermined conditions of the occupant and vehicle which are sensed by one or more sensors and relayed to the initiator device 80. The predetermined conditions preferably include the mass of the occupant, the position of the occupant, the seat belt usage of the occupant, and the amount and direction of vehicle deceleration. For a given set of predetermined conditions at the time of inflator activation, a signal is sent to the initiator device 80 which tells the initiator device 80 the predetermined time at which it should fire and move the movable member 50 from the first position to the second position for those particular set of conditions. For example, the initiator device 80 can be fired for moving the movable member 50 at a time of 10 ms into inflator activation or 20 ms into inflator activation or at any other time during inflator activation.

Thus, if the initiator device 80 is not fired, then the movable member 50 remains in the first position and the inflator vent opening 21 is closed during the entire time of inflator gas discharge. The full amount of inflator gas is then used to fill the air bag 27. Alternately, the initiator device 80 may be fired at the same time as inflator activation (time=0 ms) such that a predetermined maximum amount of inflator gas is expelled out through the vent opening 21 and the least amount of gas is used to fill the air bag 27. Thus, for each module 10, a predetermined maximum amount of venting can be defined which is the maximum amount of venting that will occur if the vent openings 21 are continuously open during the entire time of inflator gas discharge. In other words, the initiator device 80 is fired and the movable member is moved to the second position at about 0 ms. The maximum amount of venting for each module 10 is set to a predetermined percentage by the size and number of the vent openings 21 on the housing 10.

Most preferably, the inflator vent opening 21 is directly aligned with certain discharge ports 31 on the inflator 30 such that substantially all of the inflator gas discharged from the predetermined number of discharge ports 31 is expelled out through the corresponding aligned inflator vent opening 21 and is never available for air bag inflation. Advantageously, this allows the maximum amount of venting to be achieved with the smallest and least amount of inflator vent openings 21 possible. This may be desirable since the vent opening 21 can affect the ride down characteristics of the air bag 27 after it is inflated. If the vent openings 21 are the smallest possible for the maximum amount of venting, then deflation of the air bag 27 upon occupant interaction is the least affected. Occupant ride down can be controlled in other manners, such as by side vent openings 24 on the housing or by vents (not shown) on the air bag 27. Alternately, the inflator vent opening 21 can also be tuned to a size that is desirable for occupant ride down as well as maximum inflator gas discharge.

After determining the maximum percent of venting for the module 10 by size and placement of the vent opening 21, any variation between the maximum amount of venting and the minimum amount of venting (typically zero venting) can be achieved by moving the movable member 50 at a predetermined time during inflator 30 activation.

Figure 7:
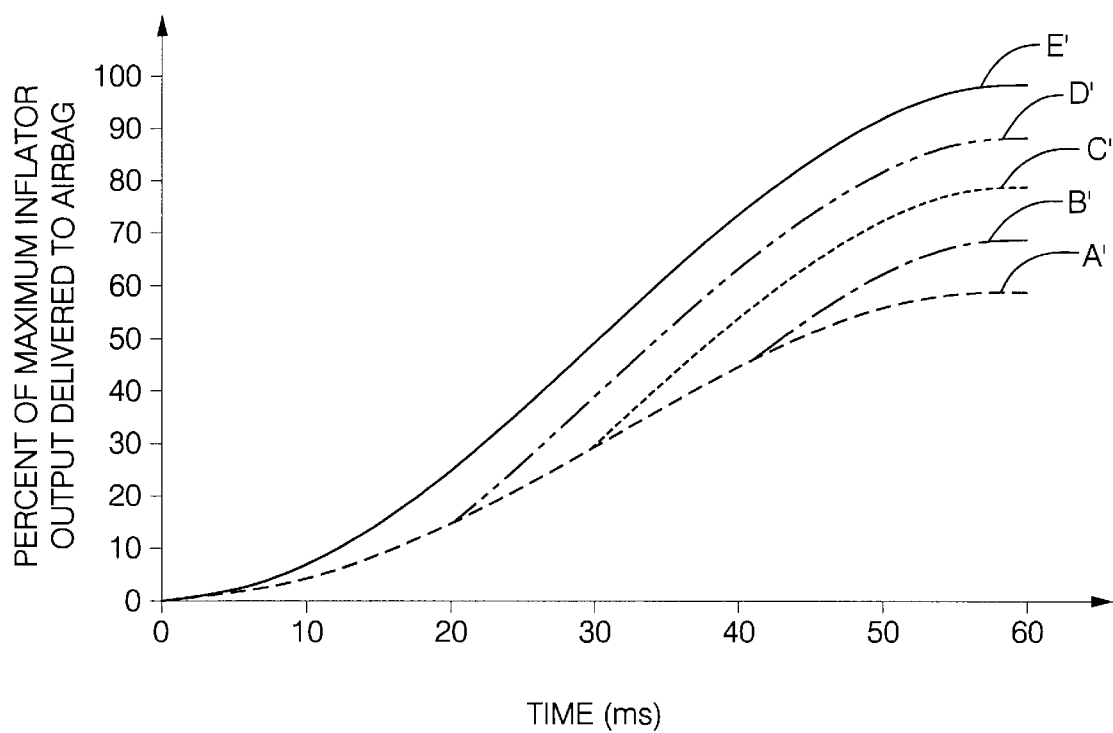
FIG. 7 is an exemplary graph depicting percent of maximum inflator output delivered to the air bag versus time for the case in which the vent opening is normally open and is closed at a predetermined time increment by the variable inflation device.

This can be further understood with reference to FIG. 7. FIG. 7 shows the generic inflation curves for a generic module having about 40% maximum venting. However, the general shape of the curves will be the same for any amount of maximum venting. The curves represent the percent of maximum inflator output delivered to the air bag 27 versus time that the inflator 30 actually discharges gas in milliseconds for a generic module in which the vent opening 21 is normally open when the movable member 50 is in the first position.

For example, curve a' represents when the movable member 50 remains in the first position during the entire inflator activation. Curve a' shows that when the vent opening 21 is never closed, only 60% of the inflator gas output is delivered to the air bag 27 for inflation and 40% or the maximum amount is expelled out through the inflator vent opening 21 in the housing 20. At the other end of the range, curve e' shows the situation in which the movable member 50 is moved to the second position during the entire inflator activation. Curve e' shows that when the vent opening 21 is closed at 0 ms or approximately at the same moment that the inflator 30 is activated, then 100% of inflator output is delivered to the air bag 27. It will be appreciated that the 40% maximum venting was a predetermined amount based on the size and location of the vent opening 21 and can be varied. Curve d' depicts that when the movable member 50 is moved to the second position at the predetermined time of 20 ms into inflator 30 activation, then about 90% of the inflator gas output is delivered into the air bag 27 and 10% of the inflator gas is expelled out through the vent opening 21. Curve c' represents the scenario in which the movable member 50 is moved to the second position at the predetermined time of 30 ms into inflator 30 activation such that about 80% of the inflator gas output is delivered into the air bag 27 and 20% of the inflator gas is expelled out through the inflator vent opening 21. Finally, curve b' represents the scenario in which the movable member 50 is moved to the second position at the predetermined time of 40 ms into inflator 30 activation such that about 70% of the inflator gas output is delivered into the air bag 27 and about 30% of the inflator gas is expelled out through the inflator vent opening 21. It will be appreciated that the curves are merely exemplary and that many other inflation variations are possible depending on the maximum amount of venting and the time at which the initiator device 80 is fired to move the movable member 50. It will be appreciated that the venting could be varied from 0% to 100% with the appropriate number of vent openings 21.

Thus, it will be appreciated that variable levels of inflation of the air bag 27 can be achieved using a single inflator 30 having only a single level of gas output in combination with at least one inflator vent opening 21 that is preferably either entirely open or entirely closed at a predetermined time during discharge of inflator gas by a movable member 50 is response to activation of a initiator device 80. Almost instantaneous control of the movable member 50 is enabled by the use of the initiator device 80 that reacts nearly instantaneously to the signal received from the vehicle sensors. The initiator device 80 is expendable since it only need be used once, if at all during the lifetime of the inflator 30. The initiator device 80 has been advantageously used to produce mechanical movement, instead of as a typical igniter. It will be appreciated that the movable member 50 need only be moved once during the lifetime of the module 10, if at all, and thus the use of an expendable device 80 is possible. It will also be appreciated that this system provides a relatively simple, cost effective and lightweight solution to providing variable levels of air bag 27 inflation from a single level inflator 30. Advantageously, the variable inflation device 49 may be added to a conventional inflator 30 without modification to turn a traditional single stage inflator 30 into a multi-level inflator, although the additional vehicle sensors would still be needed for sensing the vehicle and occupant conditions. Also advantageously, this invention uses expendable parts, which are only moved once, if at all, such that reliability over numerous cycles of movement is not a concern. Furthermore, the inflator vent opening 21 is either entirely open or entirely closed such that the movable member 50 can be quickly fired open. There is no careful movement of the movable member 50 which is needed for partially opening or partially closing the vent openings 21.

It will be understood that a person skilled in the art may make modifications to the preferred embodiment shown herein within the scope and spirit of the claims. For example, although the inflator 30 is preferably a single stage inflator, it is not limited to use with a single stage inflator. The invention could also be used with a dual-stage or multi-stage inflator if desired, but is not necessary to provide variable inflation at nearly any level. Although only one movable member 50, one vent opening 21, and one device 80 are shown it will be appreciated that there could be additional devices 80, vent openings 21 and movable members 50 on a given module 10. Although the inflator vent opening 21 is preferably shown in the bottom wall 16, it will be appreciated that the inflator vent opening 21 could be located anywhere on the housing 20 as long as it is directly aligned with certain ports 31 of the inflator 30.

Although the embodiment shows the movable member 50 opening the inflator vent opening 21 in the first position prior to inflator activation and closing the inflator vent opening 21 at a predetermined time when moved to the second position upon activation of the initiator device 80, it will be appreciated that the movable member 50 may alternately close the vent opening 21 in the first position prior to inflator activation and open the vent opening 21 at a predetermined time during inflator activation when moved to the second position upon firing of the initiator device 80.

Figure 5:
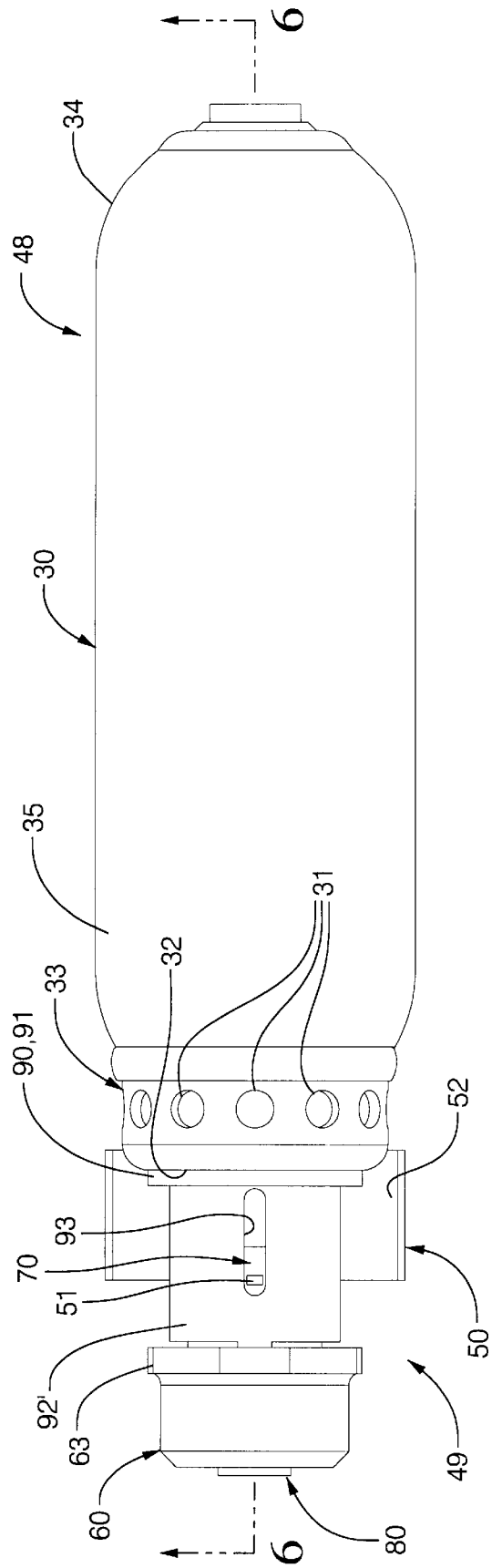
FIG. 5 is a top assembled view similar to FIG. 4, but showing an alternate embodiment of the invention.
Figure 6:
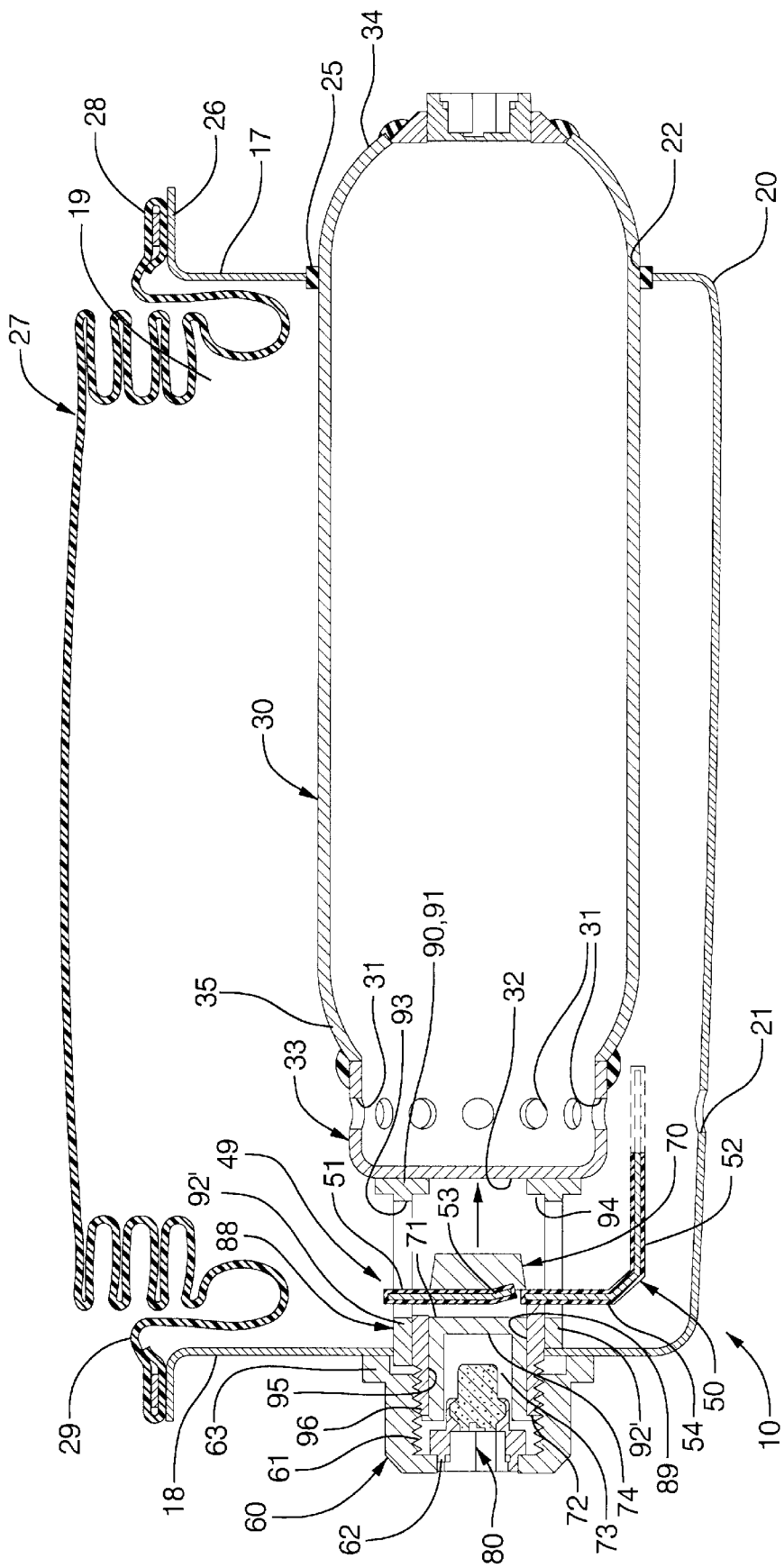
FIG. 6 is a sectional view taken generally along line 6—6 of FIG. 5, but including the housing and air bag.

FIGS. 5 and 6 show an alternate embodiment of the invention which is generally similar to the embodiment of FIGS. 1–3 and which has the same descriptions as above for the same components having the same numbers. The main difference in this embodiment is that the spacing shoulder 92 from the embodiment of FIGS. 1–4 has been replaced by a spacing ring 92' which is slip-fitted over the support member 88 for positioning the support member relative to the housing 20.

Another alternate embodiment of the invention will now be described with reference to FIG. 8. The embodiment of FIG. 8 will be described using similar references numerals increased by 100. In brief, the embodiment of FIG. 8 differs from the above embodiments in that the movable member 150 is further integrated with the diffuser portion 132 of the inflator 130.

Figure 8:
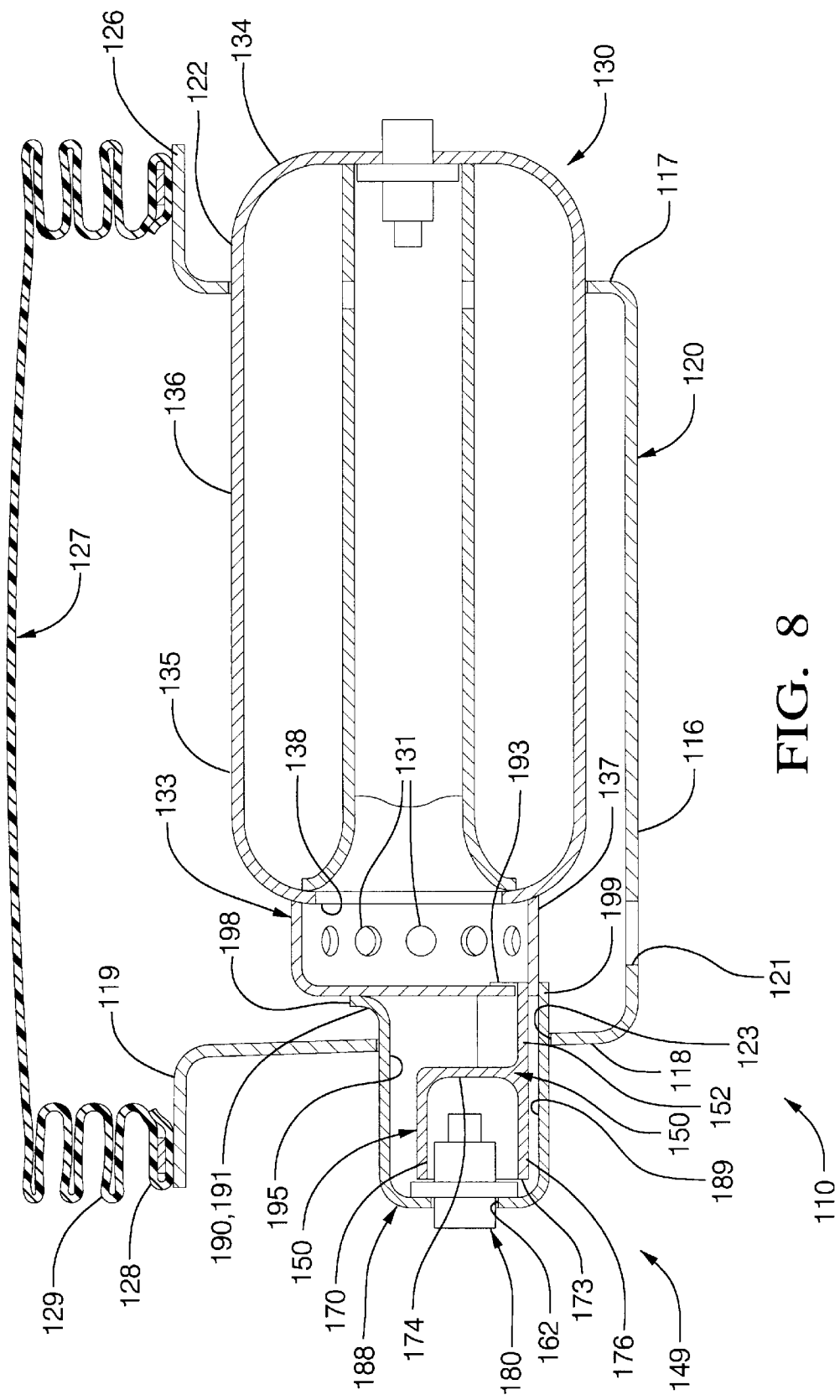
FIG. 8 is a side sectional view similar to FIG. 3, but showing another alternate embodiment of the invention.

Referring to FIG. 8, an air bag module 110 is mounted in a vehicle (not shown) for protection of a vehicle occupant (not shown). The module 110 includes a housing 120, an inflatable air bag 127, and an inflator 130 for generating gas to inflate the air bag 127. The module 110 further includes a variable inflation device 149 which is mounted on the inflator 130 and is used to vary the amount of inflator gas available for air bag inflation and to mount the inflator 130 to the housing 120, as described in detail hereinafter.

The housing 120 includes opposing sides walls (not shown) joined by a bottom wall 116 and opposing end walls 117, 118. The end wall 117 includes an enlarged first end opening 122 for receiving the inflator 130 and variable inflation device 149 therethrough during assembly. In addition, the other end wall 118 preferably includes a second end opening 123 which is smaller than the first end opening 122 for mounting the components of the variable inflation device 149. The side walls 114, 115 and end walls 117, 118 cooperatively define a housing opening 119 through which the air bag 127 is deployed. The housing 120 further includes one or more direct inflator vent openings 121 which are preferably positioned in the bottom wall 116 of the inflator 130 and which are directly aligned with specific predetermined discharge ports 131 in the bottom of the inflator 130.

As best shown in FIG. 1, the inflator 130 may be of any conventional construction for generating inflator gas to inflate the air bag 127. Advantageously, the inflator 130 is preferably a single stage inflator 130 which outputs inflator gas at a single level for inflating the air bag 127. The inflator 130 has a generally cylindrical body portion 136 and is insertable through the first end opening 122 in the end wall 117 for insertion within the housing 120. The inflator 130 also includes a plurality of discharge ports 131 which are preferably circumferentially spaced around a diffuser portion 133 of the inflator 130. Preferably, certain predetermined discharge ports 131 are generally in direct alignment with the corresponding direct inflator vent openings 121 in the bottom wall 116 of the housing 120. The inflator 130 includes a first end 134 and an opposite second end 135 on which the diffuser portion 133 is located. The second end 135 of the inflator 130 includes a generally flat head portion 132 onto which the variable inflation device 149 can be attached and which also serves as a stop surface for the movable member 150, as described further hereinafter. The second end 135 of the inflator 130 is operatively connected to the housing 120 by the variable inflation device 149, as described further hereinafter.

The air bag 127 may be of any conventional construction for inflating upon the discharge of inflator gas. Upon activation of the inflator 130, the air bag 127 is filled with a predetermined amount of inflator gas as dictated by the variable inflation device 149 and deploys out through the housing opening 119 for protection of the vehicle occupant. A cushion retainer 128 sewn into a mouth portion 129 of the air bag 127 may be utilized to attach the air bag 127 to a rim portion 126 of the housing 120.

The variable inflation device 149 includes the movable member 150, a support member 188, and an initiator device 180. The support member 1.88 preferably has a hollow tubular shape. The support member 88 includes interior walls 195 defining an axial opening 189 into which the movable member 150 and the initiator device 180 can be inserted during assembly. The support member 188 includes a first support end 190 preferably having flange portion 191 that is secured directly to the head portion 132 of the diffuser portion 133 of the inflator 130 at the second end 135. The flange portion 191 may be secured by any suitable method, such as welding, and the support member 188 is preferably made of a metallic material. The flange portion 191 includes a bent portion 198 that is welded atop the head portion 132 of the diffuser portion 133 and has straight portion 199 that is attached to a side wall 137 of the diffuser portion 133. The support member 188 is sized about the same as the second end opening 123 of the housing 120 so that the support member 188 is press fit into the second opening 123 of the housing 120 during assembly. The support member 188 includes a cap opening 162 into which the initiator device 180 can be inserted by a press fit attachment.

As best shown in FIG. 8, the diffuser portion 133 includes a guide hole 193 in the head portion 132. The guide hole 193 is positioned adjacent certain predetermined ports 131 on the inside of the diffuser portion 133. The guide hole 193 allows insertion of the movable member 150 to block certain predetermined inflator ports 131 upon activation of the initiator device 180, as described further hereinafter. The support member 188 may include an orientation feature for proper positioning of the support member 188 relative to the housing 120 and for proper positioning of the guide hole 193.

The variable inflation device 149 further includes the movable member 150 which is preferably integrally formed from a plastic material and has a generally cylindrical shape. The movable member 150 of this embodiment also serves as the plunger, such that one component is eliminated and the movable member 150 is one piece with the former plunger. The movable member 150 includes a plunger portion 170 and a slide portion 152. The movable member 150 is seated inside the support member 188 and preferably has a first end 176 that is suitably attached to the initiator device 180, such as by adhesion or snap-fit. The movable member 150 has a size smaller than the axial opening 189 such that the movable member 150 is slidable relative to the interior walls 195 of the support member 188. Upon activation of the initiator device 180, the plunger portion 170 and slide portion 152 slide within the support member 188 until the slide portion 152 engages the back diffuser wall 138 of the diffuser portion 133 which acts as a stop surface. The plunger portion 170 also preferably includes an axial plunger bore 173 in which the initiator device 180 is seated prior to activation. A reaction surface 174 of the plunger 170 is located in the bottom of the axial bore 173. The movable member 150 may also include an orientation feature for proper alignment of the slide portion 152 during assembly.

The slide portion 52 is preferably integrally formed with the plunger portion 152 in this embodiment to provide the movable member 150. The slide portion 152 is generally planar and preferably follows the curvature of the diffuser portion 133 and is shaped for being received into the guide hole 193 on the diffuser portion 133. The movable member 150 is movable relative to the inflator vent opening 121 and inflator ports 131 for opening and closing the inflator vent opening 121 at a predetermined time to control the amount of inflator gas discharged into the air bag 127 and the amount of inflator gas expelled out through the inflator vent opening 121 of the housing 120. The slide portion 152 of the movable member 150 is vertically alignable between the inflator vent opening 21 and certain predetermined discharge ports 131. The movable member 150 is shown in a first position in solid lines in which the inflator vent opening 121 is open for lowering the amount of gas available for air bag inflation. FIG. 8 shows the slide portion 152 in phantom lines in a second position in which the movable member 150 is in the closed condition to block the inflator vent opening 121 and permit full inflation of the air bag 127.

Securement of the wall portion 176 of the plunger portion 170 to the initiator device 180 holds the movable member 150 in a first initial position within the support member 188. It will be appreciated that in the first position, the slide portion 152 is preferably not aligned with the inflator vent opening 121 on the housing 120 such that the inflator vent opening 121 is preferably entirely open prior to activation of the inflator 130 for controlled reduction in inflation gas available for initial air bag inflation. Upon activation of the initiator device 180, the plunger portion 170 breaks away from the initiator device 180 by the force of the initiator device 180 on the reaction surface 174 and the movable member 150 is movable to a second position in which the slide portion 152 is aligned with the inflator vent opening 121 on the housing 120. Thus, when the movable member 150 is in the second position, the inflator vent opening 121 is entirely closed such that all inflation gas is available for air bag inflation.

The initiator device 180 or squib preferably contains a chemical which is ignited upon receiving a signal from vehicle sensors (not shown). A wire (not shown) transmits a signal from the sensors to the initiator device 180 to activate the initiator device 180. Upon activation, the initiator device 180 produces a pressure wave that presses against the reaction surface 174 of the plunger portion 170 and quickly forces the movable member 150 from the first position to the second position. Advantageously, the initiator device 180 produces a pressure wave almost instantaneously and preferably within less than 1 ms after activation. Thus, upon firing of the initiator device 180 the movable member 150 is moved from the first position in which the vent openings 121 are entirely open to the second position in which the vent openings 121 are entirely closed, almost instantaneously.

Advantageously, certain predetermined inflator ports 131 are aligned directly with the inflator vent opening 121 such that the when the movable member 150 is in the first position, the inflator gas is expelled directly out through the inflator vent opening 121 and is never used to inflate the air bag 127.

By using the variable inflation device 149, the amount of inflator gas discharged into the air bag 127 is variable to a wide range of levels, even with the use of the single stage inflator 130, as described above with regard to FIGS. 1–3 and 7.

It will be understood that a person skilled in the art may make modifications to the preferred embodiment shown herein within the scope and spirit of the claims. For example, although the inflator 130 is preferably a single stage inflator, it is not limited to use with a single stage inflator. The invention could also be used with a dual-stage or multi-stage inflator if desired, but is not necessary to provide variable inflation at nearly any level. Although only one movable member 150, one inflator vent opening 121, and one initiator device 180 are shown it will be appreciated that there could be additional initiator devices 180, inflator vent openings 121 and movable members 150 on a given module 110. Although the inflator vent opening 121 is preferably shown in the bottom wall 116, it will be appreciated that the inflator vent opening 121 could be located anywhere on the housing 120 as long as it is directly aligned with certain ports 131 of the inflator 130.

Although the embodiment shows the movable member 150 opening the inflator vent opening 121 in the first position prior to inflator activation and closing the inflator vent opening 121 at a predetermined time when moved to the second position upon activation of the initiator device 180, it will be appreciated that the movable member 150 may alternately close the vent opening 121 in the first position prior to inflator activation and open the vent opening 121 at a predetermined time during inflator activation when moved to the second position upon firing of the initiator device 180.

While the present invention has been described as carried out in specific embodiments hereof, it is not intended to be limited thereby but is intended to cover the invention broadly within the scope and spirit of the appended claims.

What is claimed is:

1. An air bag module for restraint of an occupant in a vehicle, the air bag module comprising:

an air bag;

an inflator being activatable to discharge inflator gas for inflating the air bag, the inflator having at least one discharge port through which inflator gas is discharged;

a housing including at least one inflator vent opening aligned with the discharge port; and a variable inflation device mounted on the inflator, the variable inflation device including a movable member alignable with the vent opening, the movable member being movable relative to the vent opening for opening and closing the vent opening at a predetermined time during inflator activation to control the amount of inflator gas discharged into the air bag and the amount of inflator gas expelled out through the vent opening of the housing;

the variable inflation device including a plunger having a reaction surface and wherein the movable member is attached to the plunger and wherein the initiator device is capable of generating pressure against the reaction surface of the plunger to move the movable member relative to the vent opening.

2. The module of claim 1 wherein the variable inflation device includes an initiator device being activatable during activation of the inflator to move the movable member relative to the vent opening at the predetermined time during inflator activation.

3. The air bag module of claim 1 wherein the vent opening on the housing and the discharge port on the inflator are directly aligned with each other such that substantially all of the inflator gas discharged from the discharge port is expelled out through the vent opening when the movable member is positioned for opening the vent opening.

4. The air bag module of claim 1 wherein the movable member opens the vent opening in the housing prior to activation of the initiator device.

5. The air bag module of claim 1 wherein the movable member is positioned in a first position for opening the vent opening such that at least a portion of the inflator gas is normally expelled out through the vent opening and wherein the movable member is movable to a second position for closing the vent opening at a predetermined time during activation of the inflator to increase the amount of inflator gas discharged into the air bag.

6. The air bag module of claim 1 wherein the vent opening on the housing and the discharge port on the inflator are aligned with each other such that substantially all of the inflator gas discharged from the discharge port is expelled out through the vent opening when the movable member is in the first position for opening the vent opening.

7. The air bag module of claim 1 wherein the movable member is positioned between the wall of the housing and the inflator.

8. An air bag module for restraint of an occupant in a vehicle, the air bag module comprising:

an air bag;

an inflator being activatable to discharge inflator gas for inflating the air bag, the inflator having at least one discharge port through which inflator gas is discharged;

a housing including at least one inflator vent opening aligned with the discharge port; and a variable inflation device mounted on the inflator, the variable inflation device including a movable member alienable with the vent opening, the movable member being movable relative to the vent opening for opening and closing the vent opening at a predetermined time during inflator activation to control the amount of inflator gas discharged into the air bag and the amount of inflator gas expelled out through the vent opening of the housing;

the variable inflation device including a support member mounted to the inflator.

9. The air bag module of claim 8 wherein the variable inflation device includes a plunger slidably mounted within the support member for movement between first and second positions and wherein the movable member is coupled to the plunger.

10. The air bag module of claim 9 wherein the plunger includes a shear feature that maintains the plunger in the first position and which breaks off for movement of the plunger to the second position.

11. The air bag module of claim 8 wherein the support member includes a spacing shoulder for limiting insertion of the support member into the housing.

12. The air bag module of claim 8 wherein the support member includes upper and lower guide holes for guiding movement of the movable member.

13. An air bag module for restraint of an occupant in a vehicle, the air bag module comprising:

an air bag;

an inflator being activatable to discharge inflator gas for inflating the air bag, the inflator having at least one discharge port through which inflator gas is discharged;

a housing including at least one inflator vent opening aligned with the discharge port; and a variable inflation device mounted on the inflator the variable inflation device including a movable member alignable with the vent opening, the movable member being movable relative to the vent opening for opening and closing the vent opening at a predetermined time during inflator activation to control the amount of inflator gas discharged into the air bag and the amount of inflator gas expelled out through the vent opening of the housing;

the inflator including a diffuser portion and wherein the variable inflation device includes a guide hole in the diffuser portion for receiving the movable member therein and for controlling the movement of the moveable member during activation of the variable inflation device within the confines of the guide hole.

* * * * *